United States Patent
Sibecas et al.

[19]

[11] Patent Number: 6,167,235
[45] Date of Patent: Dec. 26, 2000

[54] METHOD AND APPARATUS FOR PROVIDING ADDITIONAL INFORMATION TO A SELECTIVE CALL DEVICE ABOUT A BROADCAST

[75] Inventors: Salvador Sibecas; Eric Thomas Eaton, both of Lake Worth, Fla.

[73] Assignee: Motorola, Schaumburg, Ill.

[21] Appl. No.: 09/243,677

[22] Filed: Feb. 3, 1999

[51] Int. Cl.[7] .................................. G08B 5/22; H04L 9/00
[52] U.S. Cl. ............................ 455/31.1; 455/4.1; 455/4.2; 455/6.3; 455/31.2; 455/31.3; 455/32.1; 340/825.26; 340/825.35; 340/825.44; 348/8; 348/12; 348/473; 348/552
[58] Field of Search ........................... 455/31.1, 31.2, 455/31.3, 32.1, 414, 403, 154.1, 158.2, 4.1, 4.2, 6.3; 348/12–13, 8–9, 552, 473; 340/825.26, 825.27, 825.35, 825.44

[56] References Cited

U.S. PATENT DOCUMENTS

| | | | |
|---|---|---|---|
| 4,536,791 | 8/1985 | Campbell et al. | 340/825.26 |
| 5,214,793 | 5/1993 | Conway et al. | 455/31.1 |
| 5,539,395 | 7/1996 | Buss et al. | 340/825.26 |
| 5,543,781 | 8/1996 | Ganucheau, Jr. et al. | 340/825.44 |
| 5,631,635 | 5/1997 | Robertson et al. | 340/825.47 |
| 5,638,450 | 6/1997 | Robson | 455/31.1 |
| 5,697,080 | 12/1997 | Kasa | 455/158.2 |
| 5,726,639 | 3/1998 | Romero et al. | 340/825.22 |
| 5,752,186 | 5/1998 | Malackowski et al. | 455/414 |
| 5,867,776 | 2/1999 | Noda | 455/31.1 |
| 5,867,780 | 2/1999 | Malackowski et al. | 455/414 |
| 5,870,030 | 2/1999 | DeLuca et al. | 340/825.44 |
| 5,936,547 | 8/1999 | Lund | 340/825.44 |
| 5,940,071 | 8/1999 | Treffers et al. | 348/13 |
| 5,953,418 | 9/1999 | Bock et al. | 348/12 |
| 5,966,113 | 10/1999 | Hidaka et al. | 340/825.44 |

*Primary Examiner*—Lee Nguyen
*Assistant Examiner*—Simon Nguyen
*Attorney, Agent, or Firm*—James A. Lamb

[57] ABSTRACT

A technique is used in a selective call communication system (100) and in a broadcast communication system (106) to provide additional information about a broadcast to a selective call device (111). A broadcast receiver (109) receives a broadcast that includes a prompt (220), such as a FLEX™ logo, and an information address signal (305), such as an inaudible portion of the sound portion of the broadcast. The prompt indicates that additional information is available in a message to be transmitted by the selective call communication system. The selective call device receives the information address signal when activated to do so in response to the prompt. The selective call device receives and decodes an information address from the information address signal and uses it to recover the message at a protocol position indicated by the information address. The additional information is then recovered from the message.

29 Claims, 6 Drawing Sheets

METHOD AND APPARATUS FOR PROVIDING ADDITIONAL INFORMATION TO A SELECTIVE CALL DEVICE ABOUT A BROADCAST

FIELD OF THE INVENTION

This invention relates in general to selective call communication systems and devices, and broadcast systems, and in particular to a method and apparatus for providing additional information to a user of a selective call device about a broadcast presented on a broadcast receiver that is of interest to a user of the selective call device.

BACKGROUND OF THE INVENTION

Selective call communication devices such as pagers using present day technology have the capability of receiving information (e.g., advertisements, news, sports information, and other types of information) besides the traditional personal messages received by pagers. One type of such non-personal message information, described herein simply as additional information, could be of benefit to advertisers who advertise using broadcast systems, such as commercial television systems. Advertisers would typically benefit if additional information could be gotten to persons who view presentations of advertisements on television receivers or receive advertisements on broadcast radio receivers, if the additional information could be provided immediately, inexpensively to the user and advertiser, and without significant effort on the part of the user.

U.S. Pat. No. 5,752,186, issued to Malackowski et al. on May 12, 1998, entitled "ACCESS FREE WIRELESS TELEPHONY FULFILLMENT SERVICE SYSTEM" describes methods in which a mobile telephone caller receives additional information relevant to a radio broadcast or other advertisement. In a first method, the caller perceives an access code, for example, on a billboard or in a radio broadcast. The caller then initiates a telephone call using an access telephone number (perhaps also transmitted in the broadcast or listed on the billboard), an by using the access code, obtains additional information relevant to the billboard or broadcast. In a second method, the caller's mobile telephone receives the access code from a roadside transmitter or radio broadcast, and automatically initiates a telephone call to receive the information. It will be appreciated that, in the first method, the caller must remember or note down numbers and use them to obtain the information, making it complicated for the caller. In the second method, all such access codes are automatically used to initiate a telephone call, making it expensive for the caller or the service supplier or the advertiser, or a combination of the three. In both instances, it will be appreciated that a telephone call is initiated by each caller obtaining the information, and that each response is uniquely conveyed to the caller, again making it expensive for the caller or the service supplier or the advertiser, or a combination of the three. Such an approach can provide additional information to the caller but does not typically achieve all of the objectives listed above.

What is needed, then, is a technique that provides additional information to a person who perceives a broadcast presentation of interest, and that achieves more of the objectives of being immediate, inexpensive, and simple for the user.

A discussion of the FLEX communication protocol for example can be found in U.S. Pat. No. 5,555,183 entitled "Method and Apparatus for Synchronous Selective Call Signal", which is hereby incorporated by reference.

DESCRIPTION OF THE PREFERRED EMBODIMENT

Figure 1:
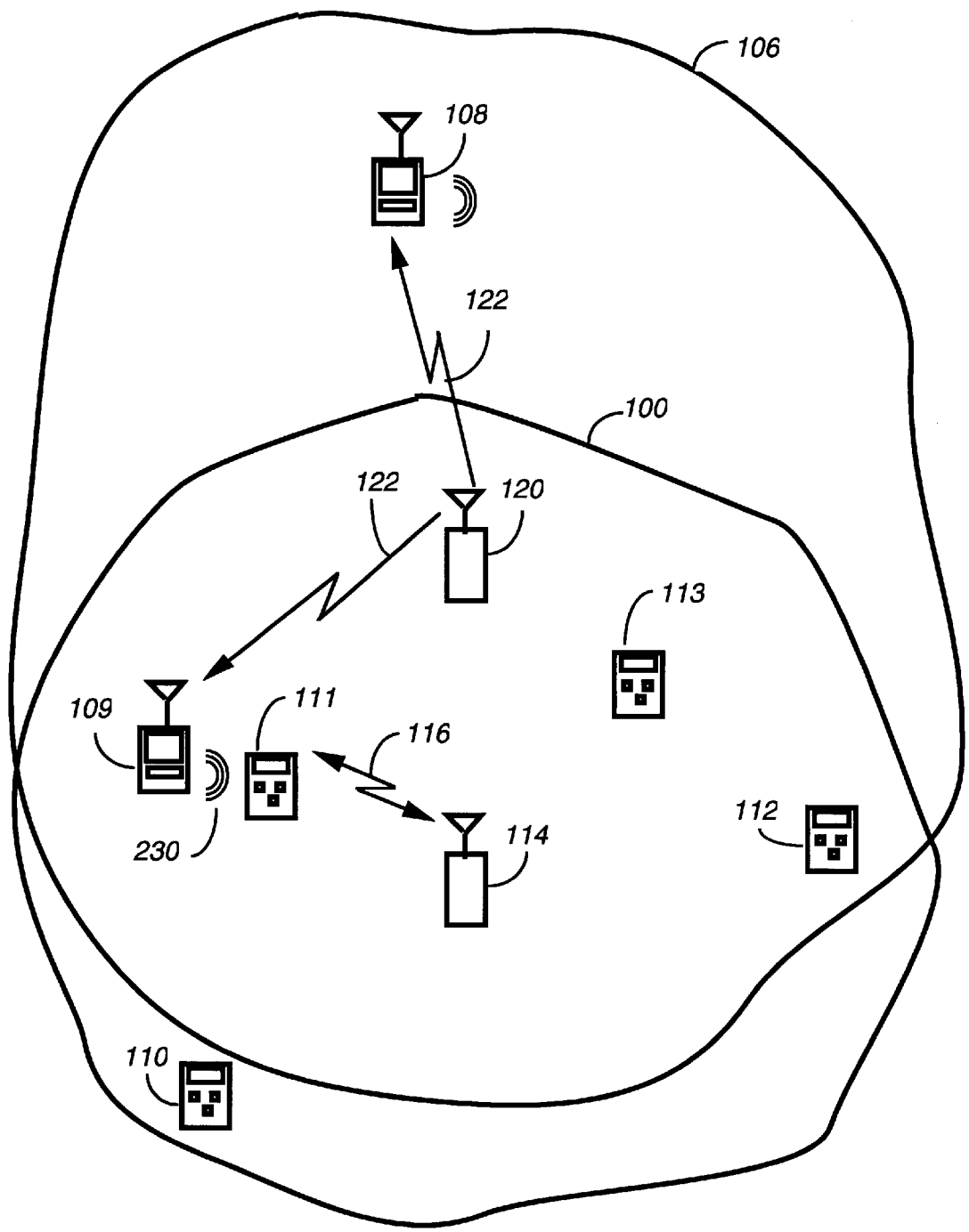
FIG. 1 shows a block diagram of a two-way paging system and a broadcast television system, in accordance with the preferred embodiment of the present invention.

Referring now to the drawings and in particular to FIG. 1, a two-way paging system 100 and a television broadcast system 106 are shown, in accordance with the preferred embodiment of the present invention. The two-way paging system 100 is representative of one and two way selective call communication systems that include paging systems, cellular radio systems, and mobile radio systems, and accordingly, the pagers used in the two-way paging system are representative of one and two way selective call devices such as one and two way pagers, cellular and personal communication system telephones, personal digital assistants having wireless modems, and mobile radios, . The two-way paging system 100 is a selective call communication system that uses the well known FLEX™ signaling, and comprises a fixed network that includes a transmitter/receiver 114 and a plurality of pagers including pagers 110, 111, 112, 113. It will be appreciated that the selective call communication system of which the paging system 100 is representative would typically comprise a plurality of transmitter/receivers 114 and/or separate transmitters and receivers. The plurality of pagers used in the selective call communications system 100 includes at least one unique pager such as one of the pagers 110, 111, 113 and can include one or more conventional pagers such as pager 112. One of the unique pagers 110 is out of range of the television broadcast system 106 in this example. Another of the unique pagers 113 is not near a broadcast receiver such as broadcast receiver 109. These two unique pagers, 110, 113 cannot make immediate use of all the functions of the present invention, but they may benefit by previously having been near a broadcast receiver that was in range of the broadcast system 109. Because the other unique pager 111 is within range of both the two-way paging system 100 and is also within the range of a signal produced by a television receiver 109 of the television broadcast system 106, the other unique pager 111 can provide the advantages of the present invention.

The television broadcast system 106 is representative of broadcast systems that include television and radio broadcast systems. The television broadcast system 106 comprises an infrastructure that includes a conventional television broadcast transmitter 120 and a plurality of conventional television receivers, of which two conventional television receivers 108,109 are illustrated in FIG. 1. A broadcast signal 122 is radiated in an essentially uniform manner within a television coverage boundary of the television broadcasting system 106, and is intercepted by the television receivers 108, 109. The broadcast signal 122 is a radio frequency signal that carries a broadcast that comprises an audio portion and a video portion. The broadcast signal 122 is generated by conventional modulation and amplification circuits of the transmitter/receiver 120, and is therefore referred to herein as a standard television signal because the broadcast signal 122 meets national standards for television signals. The audio and video portions of the broadcast are conventional in some aspects and unique in other aspects. They are conventional in that the signals comprising each portion are within standard bandwidths specified for the signals, but they are unconventional as to the information that is included in each signal.

Figure 2:
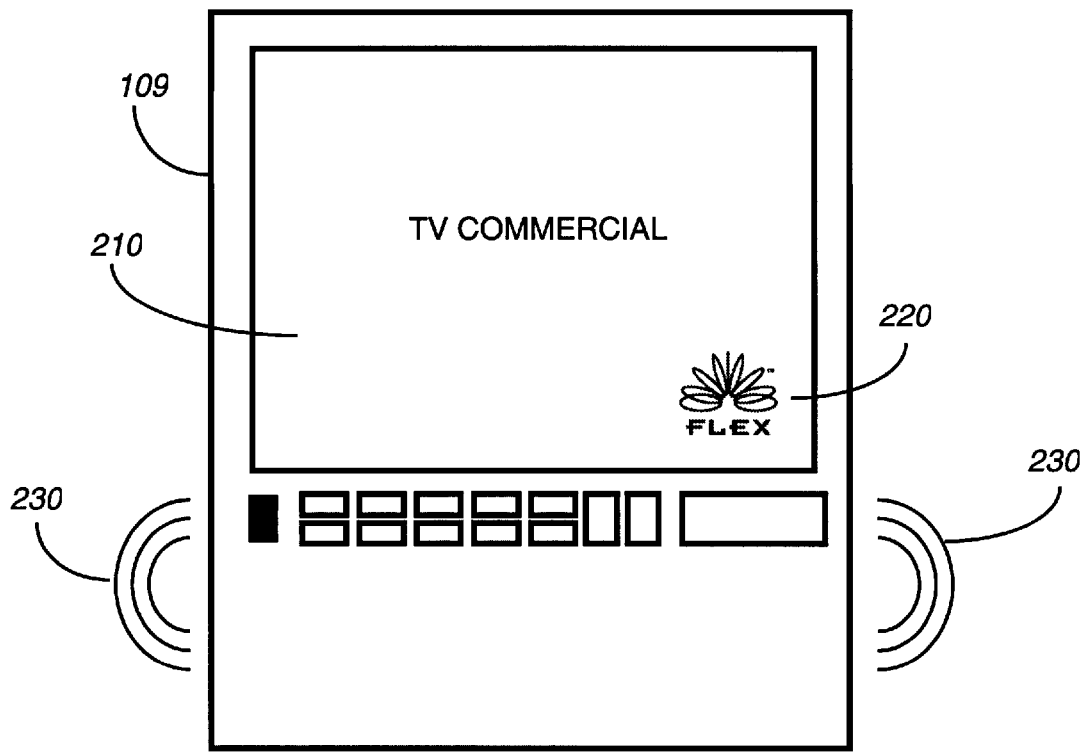
FIG. 2 is a front view of a television broadcast receiver that is presenting a commercial broadcast, in accordance with the preferred embodiment of the present invention.

Referring now to FIG. 2, a front view of the television receiver 109 is shown, in accordance with the preferred embodiment of the present invention. In this example, the television receiver 109 is presenting a broadcast that is a TV commercial of 30 seconds duration. During a significant portion of the duration of the TV commercial (e.g., enough time for most viewers to see and react to it, such as 15 seconds), a prompt 220 is shown on the video portion of the broadcast. In this example the prompt 220 is located in the lower right hand corner of the TV screen 210. The prompt 220 is a well known symbol or icon that indicates to the viewer that of the TV commercial that additional information concerning the subject of the TV commercial is available. The prompt 220 in this example is a well-known trademark, the FLEX signaling trademark, that indicates to the user that the additional information is available by use of a FLEX communication system. The prompt 220 is preferably shown within the TV commercial beginning at the start of the commercial, or shortly thereafter, and is retained in the commercial until the end of the commercial. It will be appreciated that a unique aspect of the prompt 220 is that its symbolism is not necessarily related to the subject matter of the TV commercial, but rather it is related to the method to use for obtaining more information related to the subject matter of the TV commercial. During the TV commercial the audio portion of the broadcast is presented to the viewer as sound 230 (also described herein as the audio presentation) emanating from TV loudspeakers. The audio presentation comprises conventional speech and/or music which is chosen to inform the viewer about the product being advertised. In accordance with the preferred embodiment of the present invention, the audio portion of the broadcast also includes a signal otherwise called herein an information address signal 305 (described below with reference to FIG. 3).

Figure 3:
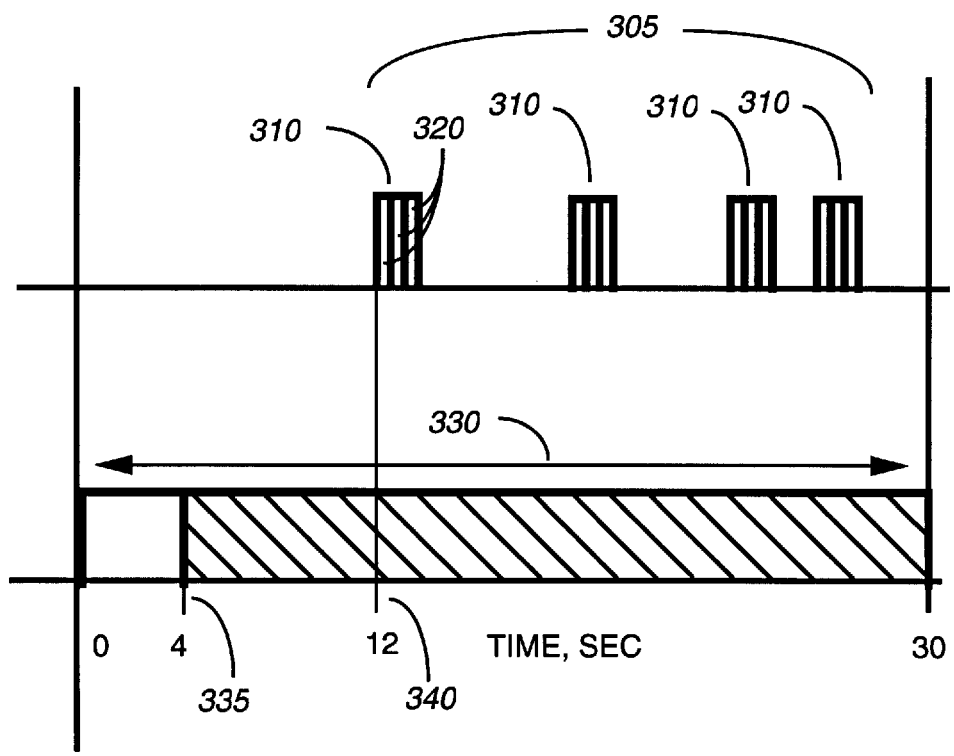
FIG. 3 is a timing a diagram of a prompt presented during the broadcast and an information address signal transmitted during the broadcast, in accordance with the preferred embodiment of the present invention.

Referring to FIG. 3, a timing a diagram of the information address signal 305 is shown, in accordance with the preferred embodiment of the present invention. The information address signal 305 in this example comprises four bursts 310, each of which comprises three repetitions of an information address 320 that includes a FLEX protocol position identifier. Each of the FLEX protocol position identifiers comprises 48 bits of information, which is sufficient to uniquely identify a FLEX protocol position within a one day period, provide other information, and provide for error correction. For example, for the protocol position identifier, five bits are used to identify the hour, four bits are used to identify the cycle, seven bits are used to identify the frame, four bits are used to identify the block, and five bits are used to identify the word at which the additional information starts. The three repetitions of the information address 320 in each burst 310 are used to provide a 2 out of three error correction scheme in a conventional manner, and the 13 bits that are not used for protocol position identifiers are used for error correction and detection in the conventional manner. Each bit of the information address 320 has a duration of one millisecond, so that each burst 310 has a duration of 144 milliseconds (the width of each of the bursts 310 has been exaggerated in FIG. 3 so as to show the repetitions of the information address 320 clearly). The bursts 310 occur at nominal 4.5 second intervals, which are varied as minimize interference between the spectral energy of the information address signal 305 and the conventional portion of the audio signal. The information address signal 305 occurs during the broadcast, which in this example has a duration 330 of 30 seconds. The prompt 220 in this example starts 4 seconds after the start of the broadcast, at a time referred to herein as the prompt start time 335, and is presented from the prompt start time 335 to the end of the broadcast. The information address signal 305 starts after the prompt start time 335; in this example starting 12 seconds into the broadcast. This delay after the prompt start time 335 allows users to react to the prompt 220 and activate their pagers 111 prior to the start 340 of the information address signal 305.

Figure 4:
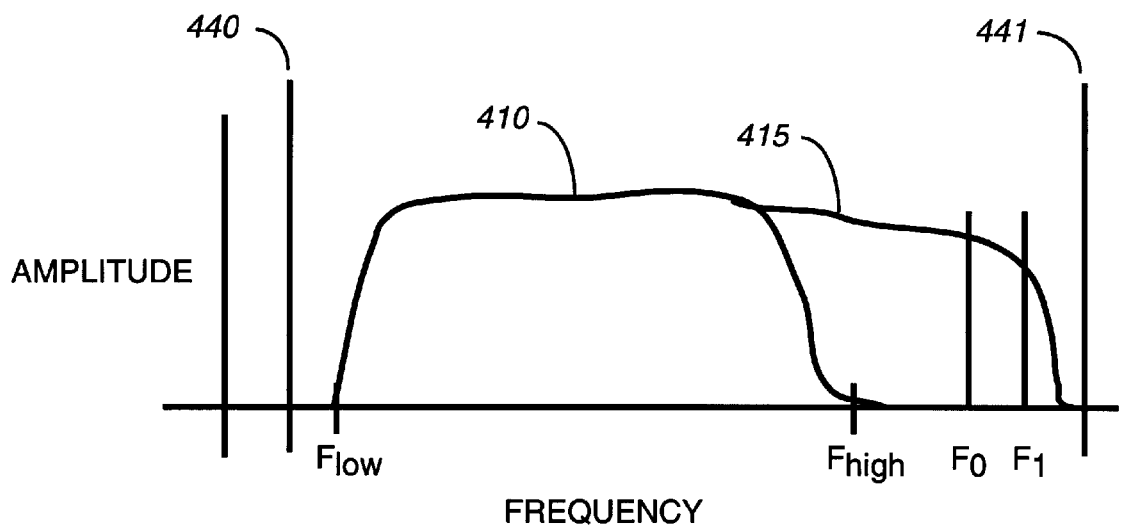
FIG. 4 is a graph of a spectrum of an audio portion of the broadcast, in accordance with the preferred embodiment of the present invention.

Referring to FIG. 4, a spectral diagram of the audio portion of the broadcast is shown, in accordance with the preferred embodiment of the present invention. The type of each bit, that is whether it is a one or a zero, is identified by a tone frequency. In this example, the tone frequency of a one is 12,000 Hertz and is identified by $F_0$ in FIG. 4, and the tone frequency of a zero is 16,000 Hertz, and is identified by $F_1$ in FIG. 4. A spectral envelope 410 shows the bandwidth occupied by typical speech patterns, extending between $F_{low}$ and $F_{high}$, while spectral envelope 415 shows the bandwidth occupied by typical music patterns. Frequency limits 440, 441 show limits allowed by national standards (e.g., FCC standards) for the audio portion of a broadcast.

Referring again to FIG. 1, the audio presentation is viewed by a user of the pager 111, who sees the prompt 220 and has an interest in further information about the TV commercial being presented. The user presses a control button on the pager 111 which activates an information address signal 305 receive mode of the pager 111. A microphone in the pager 111 intercepts the audio presentation, and the pager 111 then receives and decodes the information address signal 305, generating the information address. The pager 111 interprets the information address and decodes a message 510 (see FIG. 5) that is transmitted by the fixed network of the two-way paging system 100 beginning at the protocol position indicated by the protocol position identifier in the information address. Information in the message is received and accepted by the pager 111 and this is the additional affirmation associated with the TV commercial whose availability is indicated by the prompt 220.

Figure 5:
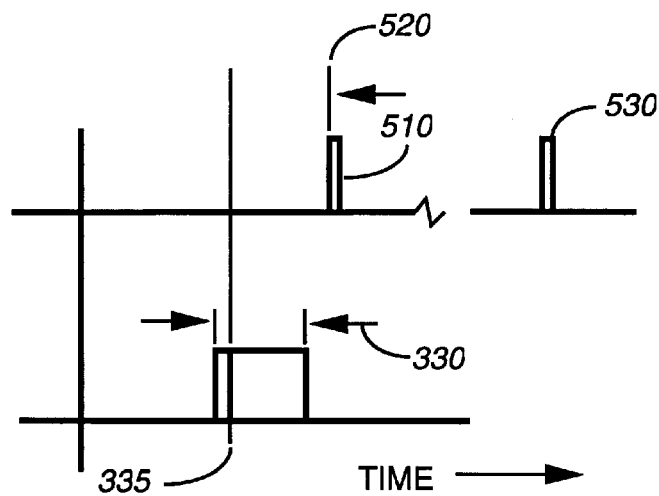
FIG. 5 is a timing diagram of the broadcast and prompt presented by the television broadcast receiver and a message transmitted by a fixed network of the selective call communication system, in accordance with the preferred embodiment of the present invention.

Referring to FIG. 5, a timing diagram of the broadcast and the message 510 is shown, in accordance with the preferred embodiment of the present invention. The duration 330 of the broadcast and the prompt start time 335 are shown on the lower axis of FIG. 5. The message 510, shown on the upper axis of FIG. 5, starts at a message start time 520. It will be appreciated that the message 510 must start after the prompt start time 335 for the message 510 to be effective. The transmission schedules for the message 510 and the prompt 220 are preferably arranged such that the message start time 520 follows the end of the last complete burst 310 of the information address signal 305. This allows the message 510 to be sent once and received by the pager 111 even in the event the user waits until near the end of the broadcast to activate the information address receive mode. For some types of broadcasts, the advertiser or other party may provide the additional information a single time. For other types of broadcasts, the advertiser or other party schedules a follow on message 530, or a plurality of such messages 530, that are sent periodically. As an example, availability of tickets for a concert can be updated every 6 or 12 hours until the time of the concert. In this case, each repetition of the information address 320 may be longer, in order to include in the protocol position identifier a protocol position for the message start time 520 as well as a period (e.g., number of FLEX™ frames) at which the message 530 will be repeated.

It will be appreciated that the audio and video portions of the broadcast are generated using video and audio mixing techniques conventionally used by commercial television program producers, resulting in an electronic recording of the broadcast that is scheduled for transmission at a predetermined time by an advertiser or other party. The advertiser or other party also schedules with an operator of the two-way paging system 100 transmission of the message 510 at a time relative to the scheduled transmission time of the prompt that allows the user to acquire the additional information quickly and easily, as described above with reference to FIG. 5, and allows the advertiser or other party to minimize the costs of getting the additional information only to interested users, by avoiding unnecessary repeated transmissions of the additional information,.

Figure 6:
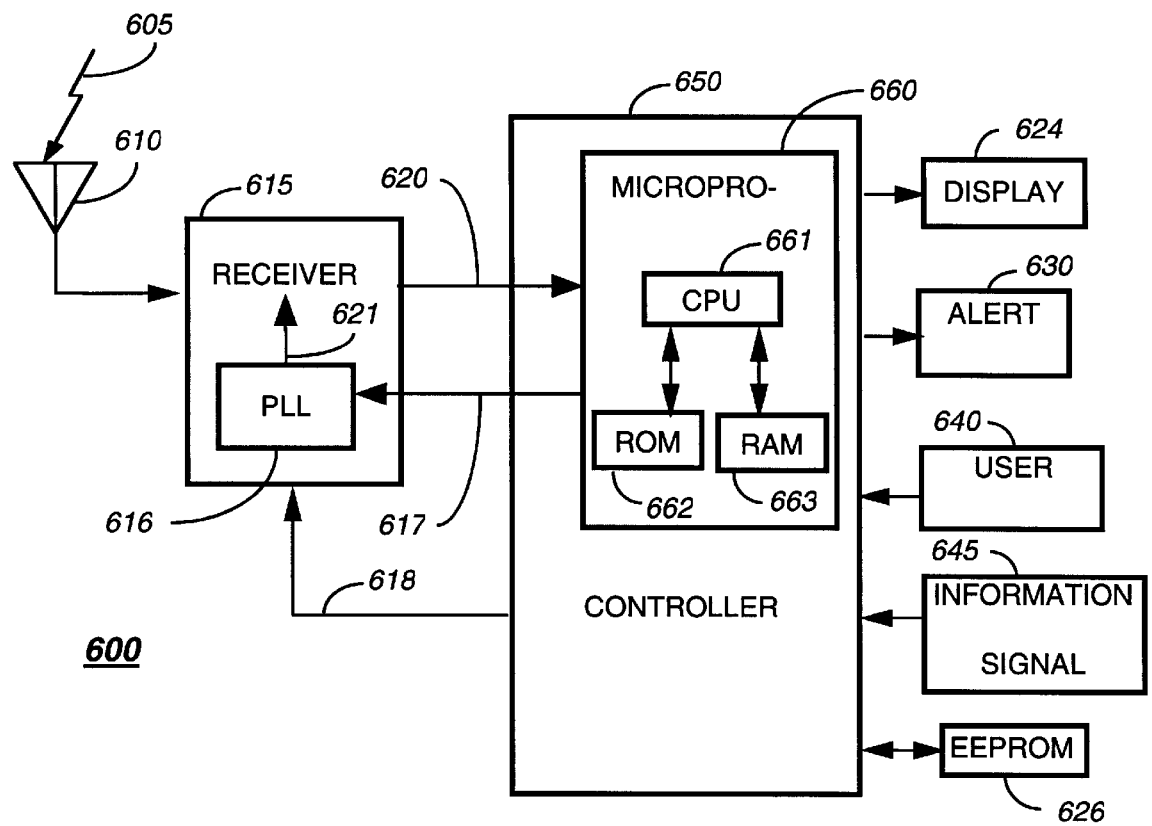
FIG. 6 is an electrical block diagram of a subscriber unit, in accordance with the preferred embodiment of the present invention.

Referring to FIG. 6, an electrical block diagram of a multichannel subscriber unit 600 is shown, in accordance with the preferred, first, and second alternative embodiments of the present invention. The subscriber unit 600 is representative of pagers 110, 111, 113. The subscriber unit 600 comprises a receiver 615 and a controller 650. A conventional antenna 610 intercepts radiated radio frequency (RF) signals 605 that are converted by the antenna 610 to conducted RF signals that are coupled to the receiver 615. The receiver 615 performs conventional receiving functions of filtering unwanted energy from the RF signal, converting the RF signal, and generating a demodulated signal 620 that is coupled to the controller 650, using a conventional phase lock loop 616 to generate a local oscillator signal. The controller 650 generates an input control 617 that is coupled to the phase lock loop 616. The controller 650 is also coupled to a display 624, an alert 630, a set of user controls 640, an information signal receiver 645, and an electrically erasable read only memory (EEPROM) 626. The controller 650 comprises a microprocessor 660, as well as other circuits not shown in FIG. 6, such as power regulation circuits. The controller 650 is also coupled to the receiver 615 by a power control signal 618 that switches the receiver off during certain frames when the controller 650 has the receiver 615 tuned to a home channel. This is for conventional battery savings purposes. The information signal receiver 645 intercepts the information address signal, which is demodulated and decoded by the controller 650.

The microprocessor 660 is coupled to the EEPROM 626 for storing an embedded address and other configuration information that is stored therein during a maintenance operation, and the microprocessor 660 loads the embedded address during normal operations of the subscriber unit 600. The microprocessor 660 is a digital signal processor of conventional circuit design, comprising a central processing unit (CPU) 661, a read only memory (ROM) 662, and a random access memory (RAM) 663.

A conventional message processor function of the microprocessor 660 decodes an outbound selective call message, generating data words that have been coded within an outbound signaling protocol conveyed by the radio signal 605, and processes an outbound personal selective call message when an address received in an address field of the outbound signaling protocol matches the embedded address stored in the EEPROM 626, in a manner well known to one of ordinary skill in the art for a subscriber unit. An outbound personal selective call message that has been determined to be for the subscriber unit 600 by the address matching is processed by the message processor function according to the contents of the outbound message and according to modes set by manipulation of the set of user controls 640, in a conventional manner. An alert signal is typically generated when an outbound personal selective call message includes user information. The alert signal is coupled to the alert device 630, which is typically either a conventional audible or a silent alerting device.

Figure 7:
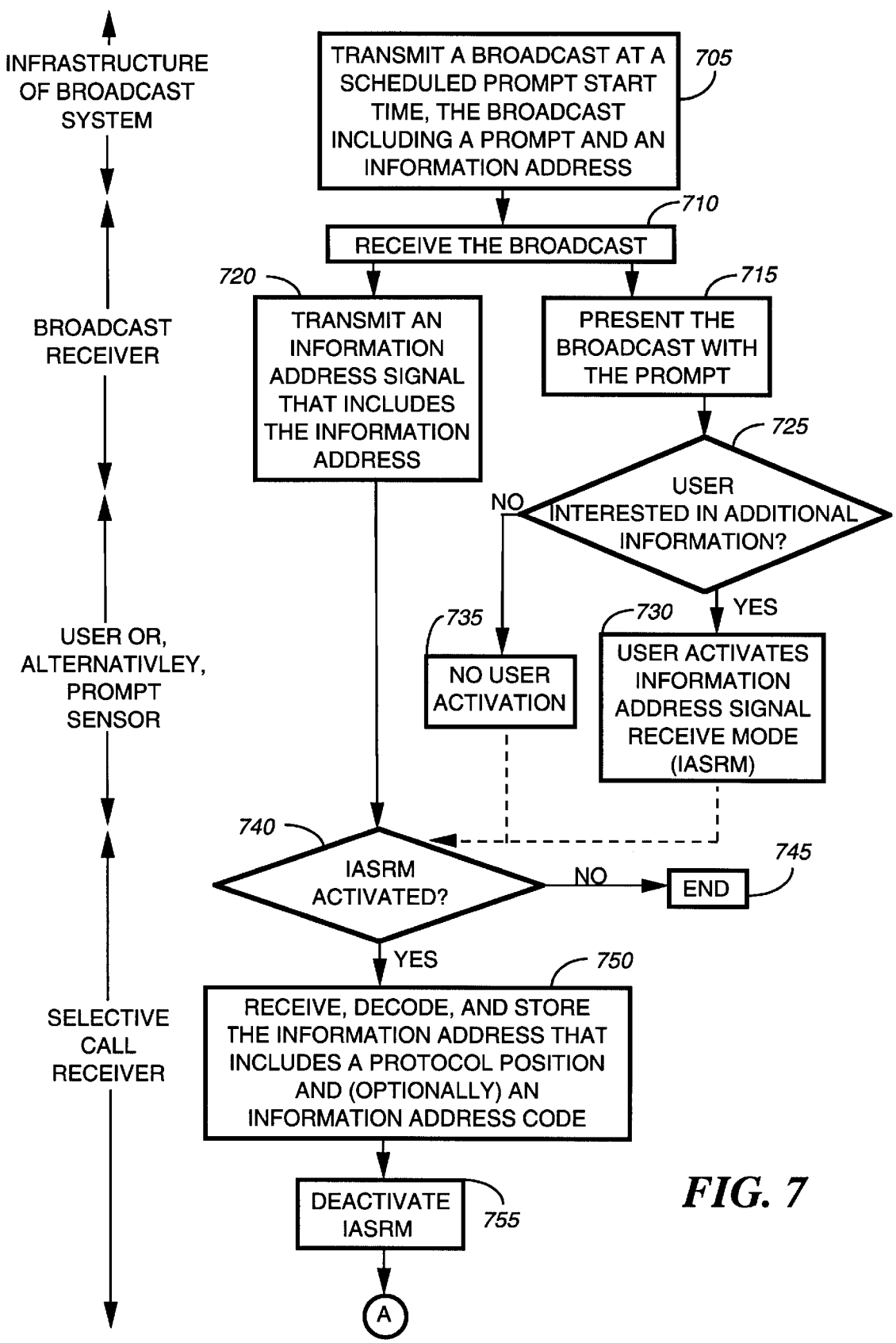
FIGS. 7 and 8 are a flow chart of a method used in a broadcast system and a selective call communication system to provide additional information about a broadcast presentation, in accordance with the preferred and alternative embodiments of the present invention.
Figure 8:
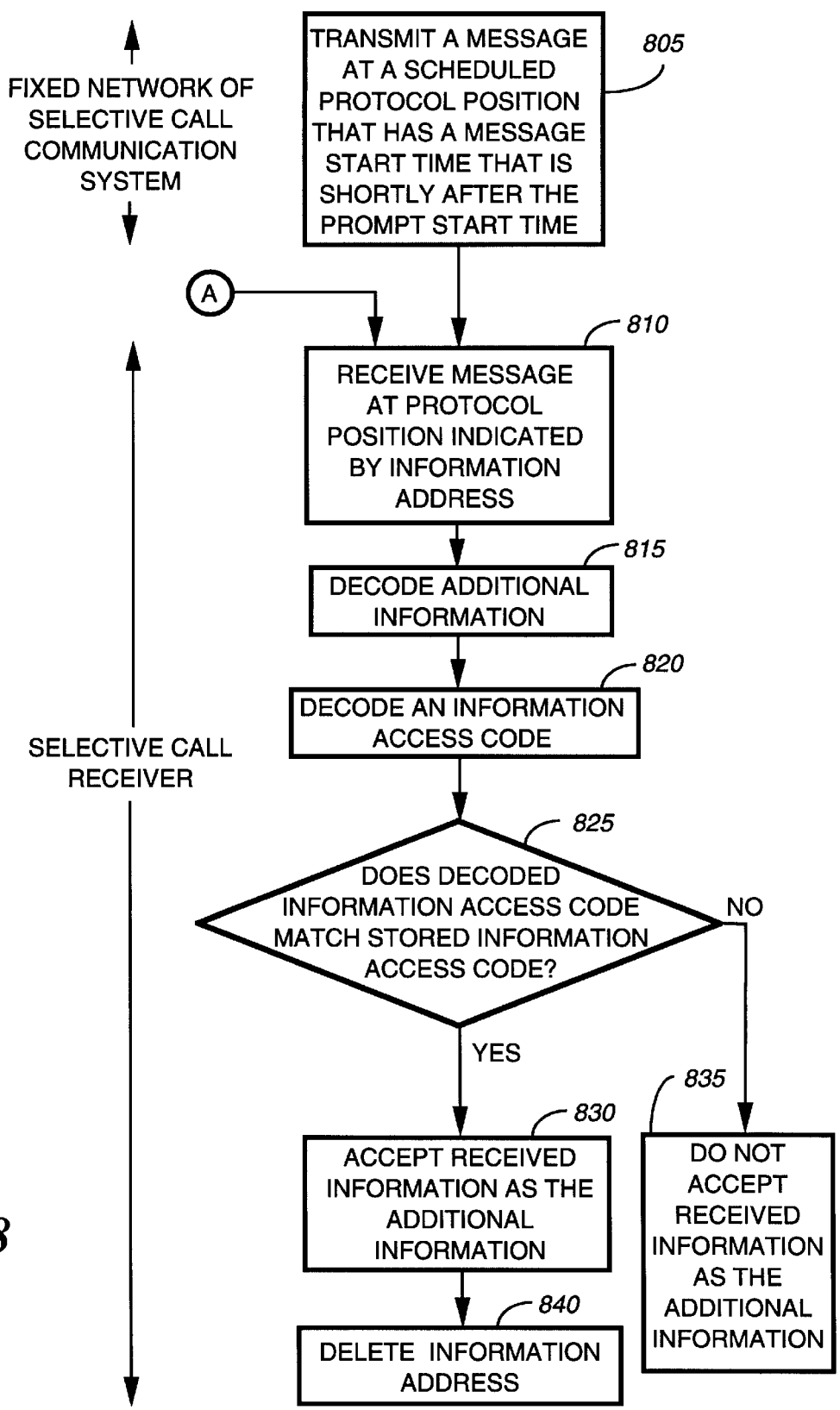

The subscriber unit 600 is preferably a conventional model Pagewriter™ 2000 pager made by Motorola, Inc. of Schaumburg, Ill., except that firmware in the ROM 662 is modified to have unique segments of firmware comprising unique combinations of conventional programming instructions that control the CPU 661, and therefore the controller 650 and the subscriber unit 600, to perform the unique message receiving operations described herein, in particular with reference to FIGS. 1–5, and also in FIGS. 7 and 8. It will be appreciated that, in accordance with the preferred embodiment of the present invention, the subscriber unit 600 can simultaneously receive an information address signal 305 and a message 510 or a personal selective call message, because the subscriber unit 600 has a separate receiver for each signal and the controller operates fast enough to demodulate the information address signal 305 while decoding a personal selective call message or the message 510. The subscriber unit 600 can alternatively be a modified version of one of many different conventional models of selective call radios that are designed to operate on a FLEX™ communication system. In the subscriber unit 600, the information signal receiver 645 is a preferably a conventional microphone that is capable of receiving the tones at frequencies $F_0$ and $F_1$. described with reference to FIG. 3, plus conventional signal conditioning circuitry that couples the transduced information address signal to a analog to digital port of the controller 650. Alternatively, the information signal receiver 645 and alert device 630 can be a single device capable of transmitting and receiving audio signals, plus conditioning circuitry. For those selective call radios that are controlled by a CPU, their programming instructions must be modified to provide the unique functions described herein. For others that are state machines, which share the characteristics of the subscriber unit 600 of having a receiver and a controller, the logic of their controller must be modified to provide the unique functions described herein. The techniques for making such modifications are well known to one of ordinary skill in the art. The description "subscriber unit" is a convenient name for a selective call radio and is not intended to restrict the subscriber unit 600 only to radios for which the service is user paid. For example, the radio may one of many radios owned by a business that operates an entire communication system. It will be appreciated that the unique selective call receivers 110, 111, 113 can alternatively be two way subscriber units.

Referring now to FIGS. 7 and 8, a flow chart of a technique used in the subscriber unit 600 to perform the retrieval of additional information related to a broadcast is shown, in accordance with the preferred and first alternative embodiments of the present invention. The technique is described in terms of more general communication systems than the television broadcast system 106 and two-way paging system 100, since the invention is usable in other system combinations (e.g., an amplitude modulation (AM) or frequency modulation (FM) radio broadcast system and a personal communication system). At step 705, in an infrastructure of a broadcast system, a transmitter transmits a broadcast that includes a prompt and the information address. The prompt in a radio broadcast system is preferably a well known phrase of music or a sequence of well known audible tones such as the tones that NBC uses. In this instance the prompts are occasionally repeated in during the broadcast instead of being presented continuously. At step 710, a broadcast receiver of the broadcast system receives the prompt and an information address. The prompt indicates that additional information is available. The information address identifies how the additional information can be received. At step 715 the broadcast receiver presents the broadcast including the prompt.

At step 720 the broadcast receiver transmits an information address signal that includes the information address. When the broadcast system is a television broadcast system, the information address signal is included in the transmission of the audio portion of the broadcast as described above with reference to FIGS. 1–5. When the broadcast system is a radio broadcast system the information address signal is included in the transmission of the audio signal from the broadcast radio receiver's speaker, along with the prompt and other broadcast audible information. As in the case of the television broadcast system described above, the information address signal in the radio broadcast system preferably comprises two tones that minimally interfere with the audible signal transmitted by the radio broadcast receiver's speaker. In both of these examples, the information address signal preferably occupies two narrow sub-bands of the spectrum audio portion of the broadcast signal. It will be appreciated that other conventional methods can be used to carry the information address signal in the audio portion of a broadcast, such as a low bit rate direct frequency modulation, wherein the demodulated information address signal is outside the audible range (i.e., subaudible). In yet other alternative embodiments of the present invention, the information address signal is transmitted using an infrared carrier or a local radio frequency carrier. In these other alternative embodiments, conventional techniques are used to modulate the infrared carrier or local radio frequency carrier with the data of the information address, and a conventional device sensor of appropriate type, plus conventional conditioning circuitry, is used for the information signal receiver 645 of the subscriber unit 600.

At step 725, when a user of the selective call device who is watching or listening to a presentation of the broadcast that includes the prompt, and the user understands that the prompt indicates that additional information about the broadcast is available, and when the user has an interest in such additional affirmation, then the user at step 730 activates an information address signal receive mode (IASRM) of his selective call device by manipulating user controls (such as the user controls 640 of the subscriber device described with reference to FIG. 6) of the selective call device in response, at least in part, to the prompt. If the user has no such interest in the additional information then at step 735 the user does not activate the information address signal receive mode. At step 740, when the user has activated the information address signal receive mode, then at step 750 the selective call device receives, decodes, and stores the information address by receiving and decoding the message in the manner as described above with reference to FIG. 6, after which the selective call device deactivates the IASRM at step 755. Otherwise, the selective call device does not receive the message, as for example by remaining in a low power mode during the message, and the method ends at step 745. The information address includes at least a protocol position, and optionally includes an information address code. In an alternative embodiment of the present invention, the user decision at step 735 is replaced by an automatic determination by a prompt sensor of the presence of a prompt. As an example, a pager having a microphone sensor for receiving the information address signal 305 can decode the microphone output to sense a tone sequence used as a prompt in a radio broadcast, as well as the information address signal. This is an example in which the prompt could be discernable by both a human user and the prompt sensor. In another example, the prompt could be an infrared signal, as is the information address signal, and a common infrared sensor is used for detecting both. The sensing of the prompt by the prompt sensor is activated or deactivated by the user, so the information address signal receive mode is activated, at least in part, to the prompt.

At step 805 a transmitter in the fixed network of the selective call communication system transmits a message at a scheduled message start time, identified by a protocol position, that is shortly after the prompt start time. The broadcast and message are typically prepared by an advertiser or other party, who schedules the broadcast with the operator of the broadcast system so that the prompt will start at a scheduled prompt time. The advertiser or other party also schedules with the operator of the selective call communication system the transmission of the message such that the message start time is not before the prompt start time, and preferably, such that the message start time follows the end of the information address signal. It will be appreciated that these scheduled times must typically be able to be achieved within an accuracy of several seconds or less, but that in modern-day systems such as synchronous selective call communication systems and television or radio broadcast systems, such accuracy is typically achievable. At step 810 the selective call device adjusts its receiver channel as necessary and powers itself on beginning at the protocol position indicated by the information address that has been received and stored at step 750, and thereby receives the message, including information that is presumably the additional information. In a FLEX™ selective call communication system, the protocol position can be either a start of a frame, wherein, for example, a global message is included, or the protocol position can be an specific frame, block, and word. In a multichannel communication system, the protocol position can also include a receive channel to which the selective call device must adjust itself when it is not already adjusted to the channel.

In accordance with the alternative embodiment described above with reference to step 750, wherein the information address includes the optional information address code, the selective call device at step 820 decodes the information access code. Also in accordance with the alternative embodiment, when the decoded information access code matches the stored information access code at step 825, then the selective call device at step 830 accepts the received information as the additional affirmation. On the other hand, when the decoded information access code does not match the stored information access code then the selective call device makes no acceptance of the information at step 835. In the preferred embodiment, the information access code is not used and the information received at step 810 is accepted when it is sufficiently error free in accordance with the standard rules used for decoding messages in the protocol of the selective call communication system. Many advertisers would not wish to restrict the class of users that receive the additional information, but some advertisers and other parties would restrict the class of users that receive the additional information by use of the information access code. The information address is preferably deleted from storage under command from the message at step 840, which is typically done after the additional information is first received (when the additional information is not of a variable nature), but deletion of the information address can alternatively be delayed in order to receive several periodic messages when the additional information does vary over time. The user is also given a manual means to delete the information address. Thus, the user can store a list of such information addresses to collect additional information relevant to several different broadcasts over a period of time, when the messages are transmitted periodically, even though the user (and selective call device) are not near a broadcast receiver.

By now, it should be appreciated that a method and apparatus has been described for providing additional information to a selective call device about a broadcast presentation that allows a user interested in the additional information to acquire it quickly and easily, while at the same time minimizing the amount of air time an advertiser must purchase in order to convey the information to the user through the selective call device. The advertiser saves costs by reducing the amount of air time needed in the broadcast, which is typically very expensive, by sending the information over the selective call communication system, and also saves costs in transmitting the additional information over the selective call communication system, in comparison to prior art systems that provide additional information, by being able to deliver the additional information in one transmission that is received by the selective call device without requiring a message or transmission from the selective call device to the fixed network of the selective call communication system.

While a preferred and alternative embodiments of the invention have been illustrated and described, it will be clear that changes, variations, substitutions and equivalents will occur to those skilled in the art without departing from the spirit and scope of the present invention as defined by the appended claims.

We claim:

1. A method used in a selective call communication system and a broadcast communication system to provide to a selective call device additional information about a broadcast, comprising the steps of:

in a broadcast receiver of the broadcast communication system,
receiving a broadcast comprising a prompt and an information address, the prompt indicating that the additional information is available, and the information address identifying how the additional information is received;
presenting the broadcast including the prompt; and
transmitting an information address signal that includes the information address;

in a fixed network of the selective call communication system,
transmitting by a fixed network transmitter of a message including the additional information; and in a selective call device of the selective call communication system,
activating an information address signal receive mode in response at least in part to the prompt;
receiving and decoding an information address from the information address signal when the information address signal receive mode is activated;
receiving the message; and
accepting the additional information when the message matches the information address received in the information address signal.

2. The method according to claim 1, further comprising, in an infrastructure of the broadcast communication system, the step of
transmitting the broadcast that includes the prompt and the information address.

3. The method according to claim 1, wherein in the step of receiving the broadcast, the broadcast is received within a broadcast signal that is a standard television signal comprising a picture portion and an audio portion.

4. The method according to claim 3, wherein the prompt is an icon appearing in the picture portion.

5. The method according to claim 3, wherein the audio portion includes the information address.

6. The method according to claim 5, wherein the information address is within one or more sub-bands of the audio portion.

7. The method according to claim 1, wherein in the step of receiving the broadcast, the broadcast is received within a radio signal that is a standard frequency modulation (FM) or amplitude modulation (AM) radio signal that includes an audio presentation.

8. The method according to claim 7, wherein the prompt is an audible indication.

9. The method according to claim 7, wherein the information address is within one or more sub-bands of the audio presentation.

10. The method according to claim 1, wherein in the step of transmitting an information address signal, the information address is transmitted using one of an infrared carrier or a local radio frequency carrier.

11. The method according to claim 1, wherein in the step of activating an information address signal receive mode, the activating is in response to a user control that is manipulated by a user in response at least in part to the prompt.

12. The method according to claim 1, wherein in the step of activating an information address signal receive mode, the activating is in response at least in part to a sensing of the prompt by a prompt sensor.

13. The method according to claim 1, wherein in the step of receiving the broadcast, the prompt and information address are demodulated using conventional techniques.

14. The method according to claim 1, wherein in the step of transmitting the information address signal, the broadcast receiver transmits the information address signal using a device that is also used to transmit another portion of the broadcast.

15. The method according to claim 14, wherein in the device is a speaker.

16. The method according to claim 1, wherein the broadcast receiver is a conventional television designed to receive, present, and transmit conventional television signals.

17. The method according to claim 1, wherein the information address signal comprises a protocol position identifier, and wherein the additional information is accepted when the message is received at a protocol position identified by the protocol position identifier.

18. The method according to claim 1, wherein the information address signal comprises a first information access code, and wherein the message further comprises a second information access code, and wherein the additional information is accepted when the first information access code matches the second information access code.

19. The method according to claim 1, further comprising the steps of:
- in an infrastructure of the broadcast communication system,
    - transmitting the prompt for presentation beginning at a prompt start time; and
- in the fixed network of the selective call communication system,
    - transmitting the message at least once, beginning at a message start time that is no earlier than the prompt start time.

20. The method according to claim 1,
- wherein in the step of transmitting the information address signal, the information address signal has and end time, and
- comprising the step in the fixed network of the selective call communication system of:
    - transmitting the message at least once, beginning at a message start time that is no earlier than the message end time.

21. The method according to claim 1, wherein the information address signal receive mode is deactivated when the information address signal is received sufficiently error free.

22. A selective call device that provides additional information about a broadcast, comprising:
- an information address signal receiver that receives an information address signal that includes an information address that identifies how the additional information is received;
- a message receiver for receiving a message that includes the additional information and the information address; and
- a controller, coupled to the information address and message receivers, that controls the selective call device to:
    - activate an information address signal receive mode;
    - decode an information address from the information address signal received when the information address signal receive mode is active; and
    - accept the additional information when the message matches the information address received in the information address signal.

23. The selective call device according to claim 22, wherein the selective call device further comprises a user control, and the controller activates the information address signal receive mode in response to a user control that is manipulated by a user in response at least in part to a prompt presented within the broadcast.

24. The selective call device according to claim 22, wherein the selective call device further comprises a prompt sensor, and wherein the controller activates the information address signal receive mode in response at least in part to an output of the prompt sensor that is in response to a prompt in the broadcast.

25. The selective call device according to claim 22, further comprising an audio sensing device coupled to the controller that intercepts the information address signal when the information address signal receive mode is activated.

26. The selective call device according to claim 22, wherein in the information address signal receiver receives the information address signal as a conventional television audio signal.

27. The selective call device according to claim 22, wherein the controller deactivates the information address receive signal mode when the information address signal is received sufficiently error free.

28. A selective call device that provides additional information about a broadcast, comprising:
- an information address signal receiver that receives an information address signal that includes an information address that is associated with the additional information;
- a message receiver for receiving a message that includes the additional information and the information address; and
- a controller, coupled to the information address and message receivers, that controls the selective call device to:
    - activate an information address receive mode;
    - decode an information address from the information address signal received when the information address signal receive mode is active;
    - store the information address; and
    - accept the additional information in response to an activation of a user control when the message matches the information address received in the information address signal.

29. The selective call device according to claim 28, wherein the controller simultaneously decodes the information address signal and a personal selective call message.

* * * * *